(12) United States Patent
Kouda et al.

(10) Patent No.: US 9,163,567 B2
(45) Date of Patent: Oct. 20, 2015

(54) VEHICLE CONTROLLER

(75) Inventors: Akinori Kouda, Kariya (JP); Tsutomu Miyazaki, Miyoshi (JP)

(73) Assignees: DENSO CORPORATION, Kariya (JP); TOYOTA JIDOSHA KABSHIKI KAISHA, Toyota (JP)

( * ) Notice: Subject to any disclaimer, the term of this patent is extended or adjusted under 35 U.S.C. 154(b) by 481 days.

(21) Appl. No.: 13/546,081

(22) Filed: Jul. 11, 2012

(65) Prior Publication Data
US 2013/0035843 A1    Feb. 7, 2013

(30) Foreign Application Priority Data

Aug. 2, 2011  (JP) .................................. 2011-169579

(51) Int. Cl.
| | |
|---|---|
| G06F 19/00 | (2011.01) |
| G06G 7/70 | (2006.01) |
| F02D 11/10 | (2006.01) |
| B60W 10/06 | (2006.01) |
| F02D 41/22 | (2006.01) |

(52) U.S. Cl.
CPC ............. F02D 11/105 (2013.01); B60W 10/06 (2013.01); F02D 11/106 (2013.01); F02D 41/22 (2013.01); *B60W 2540/10* (2013.01); *B60W 2540/12* (2013.01); *F02D 2200/501* (2013.01); *Y02T 10/40* (2013.01)

(58) Field of Classification Search
CPC ............ B60W 10/06; B60W 2540/10; B60W 2540/12; B60W 20/50; F02D 29/02
USPC ............................................ 701/84, 102, 110
See application file for complete search history.

(56) References Cited

U.S. PATENT DOCUMENTS

| | | | | |
|---|---|---|---|---|
| 5,193,640 | A * | 3/1993 | Lee ............................... | 180/271 |
| 5,439,429 | A * | 8/1995 | Lee ............................... | 477/207 |
| 2010/0036566 | A1 | 2/2010 | Hayami | |
| 2011/0295468 | A1* | 12/2011 | Crombez et al. ................ | 701/48 |
| 2011/0295480 | A1* | 12/2011 | Shimada et al. ................ | 701/70 |
| 2012/0116650 | A1* | 5/2012 | Miyazaki et al. ............. | 701/102 |
| 2012/0259524 | A1* | 10/2012 | Miyazaki et al. ............... | 701/70 |
| 2014/0095045 | A1* | 4/2014 | Takagi et al. ................... | 701/70 |
| 2014/0129049 | A1* | 5/2014 | Shimida et al. .................... | 701/1 |
| 2014/0136084 | A1* | 5/2014 | Takagi et al. .................. | 701/110 |

FOREIGN PATENT DOCUMENTS

JP       2005-291030       10/2005

* cited by examiner

*Primary Examiner* — Mahmoud Gimie
*Assistant Examiner* — Sizo Vilakazi
(74) *Attorney, Agent, or Firm* — Nixon & Vanderhye P.C.

(57) ABSTRACT

When a computer determines that an accelerator pedal and a brake pedal are simultaneously stepped based on the signals from the accelerator position sensor and a brake switch, the first switch is turned off so that the accelerator sensor signal which will be transmitted into the computer is compulsorily made zero. A throttle-position command value which will be transmitted from the computer into a throttle actuator is reduced to a value corresponding to the idling state. If an engine output is not reduced, the computer turns off a second switch so that a throttle actuator is de-energized. A throttle valve is compulsorily brought into a position corresponding to an idling state by a biasing force of a throttle return spring.

17 Claims, 4 Drawing Sheets

VEHICLE CONTROLLER

CROSS-REFERENCE TO RELATED APPLICATION

This application is based on Japanese Patent Application No. 2011-169579 filed on Aug. 2, 2011, the disclosure of which is incorporated herein by reference.

TECHNICAL FIELD

The present disclosure relates to a vehicle controller which controls a vehicle when an accelerator operation and a brake operation of the vehicle are performed simultaneously.

BACKGROUND

For example, JP-2005-291030A describes a vehicle control system in which an engine is compulsorily brought into idling state when an accelerator pedal and a brake pedal are simultaneously stepped over a specified amount.

However, it is not specifically described how to bring the engine into idling state when an accelerator pedal and a brake pedal are simultaneously stepped. Generally, regarding a gasoline engine equipped with an electronic throttle system, following techniques can be conceivable as an output-reducing control by which the engine is brought into idling state.

(1) An accelerator signal input is set to zero so that a throttle-valve command value, which is transmitted to a throttle actuator, is decreased to a value corresponding to idling state.

(2) A throttle-valve command value transmitted to a throttle actuator is compulsorily decreased to a value corresponding to idling state.

(3) A throttle actuator is deenergized so that a throttle valve is compulsorily closed by a biasing force of a throttle return spring.

(4) A fuel injection is not intermittently performed to reduce an engine output.

(5) An ignition is not intermittently performed to reduce an engine output.

However, in the above output-reducing controls (4) and (5), it is likely that exhaust gas becomes rich or lean so that emission is increased and a catalyst is deteriorated.

Also, in the above output-reducing controls (2) and (3), other controls, such as traction control, electronic stability control, and cruise control are canceled by the output-reducing control. Thus, the throttle valve is compulsorily closed, whereby drivability may be deteriorated.

In the above output-reducing control (1), since the accelerator signal input is compulsorily changed, it is likely that the engine output can not be sufficiently decreased due to other inputs.

SUMMARY

It is an object of the present disclosure to provide a vehicle controller which can surely reduce an engine output without an increase in emission and a deterioration in drivability even if an accelerator operation and a brake operation of the vehicle are performed simultaneously.

According to the present disclosure, a vehicle controller controls a vehicle equipped with at least one of an internal combustion engine and a motor as a driving source. The vehicle controller includes: an accelerator-operation detector detecting an accelerator operation; a brake-operation detector detecting a brake operation; and an output controller controlling an output of the driving source according to an accelerator operation amount detected by the accelerator-operation detector.

The vehicle controller further includes a first output-reducing controller performing a first output-reducing control in which an accelerator operation amount which will be transmitted into the output controller from the accelerator-operation detector is compulsorily reduced, when the accelerator-operation detector and the brake-operation detector simultaneously detect the accelerator operation and the brake operation. Furthermore, the vehicle controller further includes a second output-reducing controller performing a second output-reducing control in which an output of the driving source is compulsorily reduced, when it is determined that the output of the driving source is not reduced even though the second output-reducing control has been performed.

Since the first output-reducing control less affects emission and drivability, the first output-reducing control is performed first. When the output of the driving source is not reduced even though the first output-reducing control has been performed, the second output-reducing control is performed so that the output of the driving source is compulsorily reduced. Therefore, a vehicle controller can surely reduce an engine output without an increase in emission and deterioration in drivability when an accelerator operation and a brake operation of the vehicle are performed simultaneously.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present invention will be described hereinafter.

First Embodiment

Figure 1:
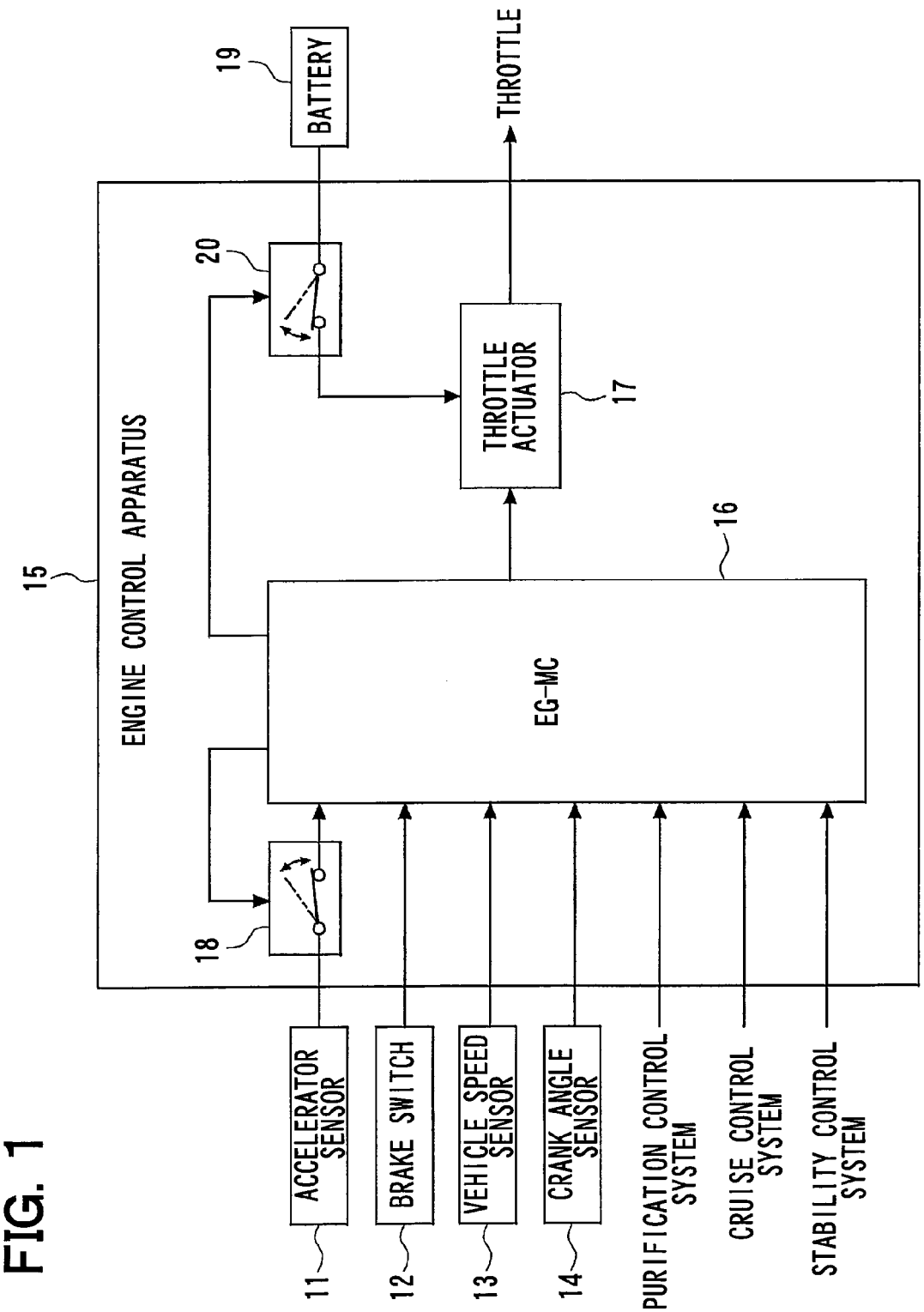
FIG. 1 is a block diagram showing a configuration of vehicle control system according to a first embodiment.
Figure 2:
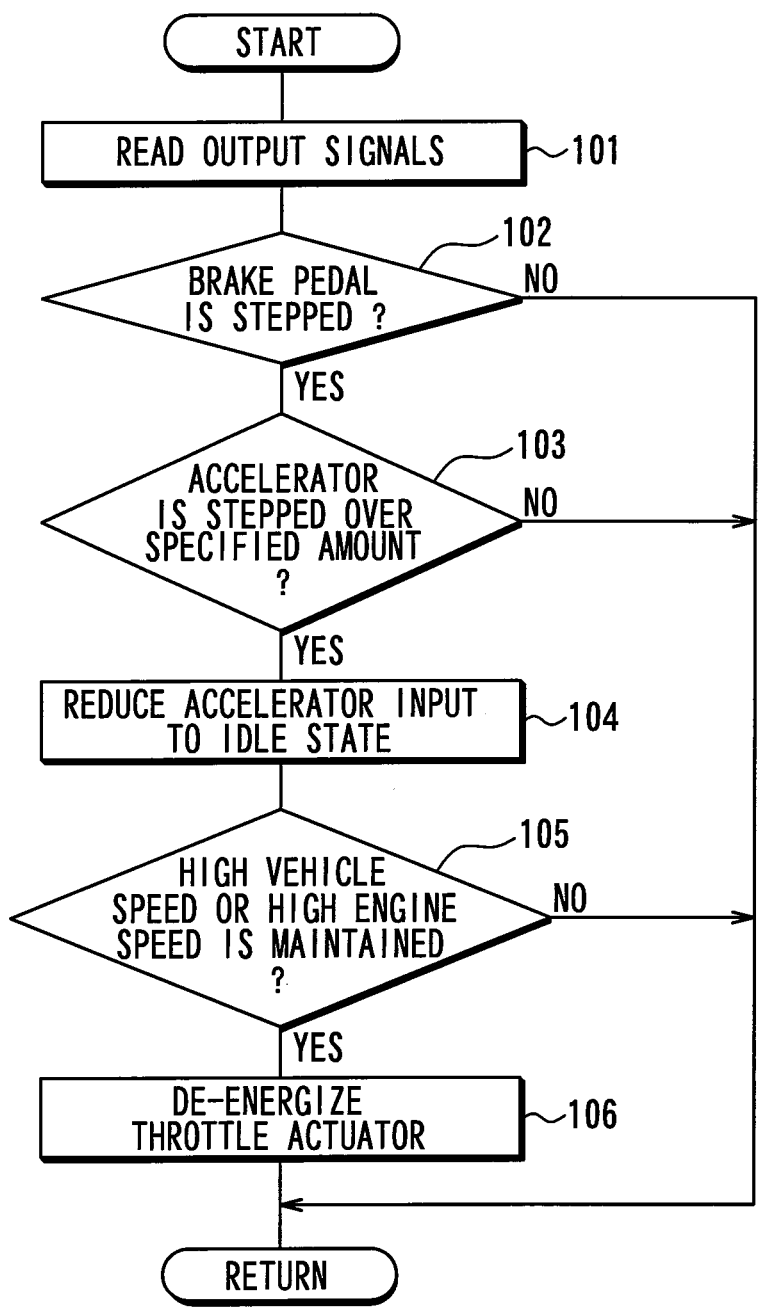
FIG. 2 is a flowchart showing a processing of the output-reducing control according to the first embodiment.

Referring to FIGS. 1 and 2, a first embodiment will be described hereinafter. First, referring to FIG. 1, a vehicle control system is explained. A vehicle is equipped with an internal combustion engine. An engine control system includes an electronic throttle system, an emission-gas-purification control system, a cruise control system, an electronic stability control system and the like.

The vehicle is equipped with an accelerator position sensor (accelerator-operation detector) 11 which detects an accelerator operation amount (accelerator position), a brake switch (brake-operation detector) 12 which turns ON/OFF according to a brake operation (step or release a brake pedal), a vehicle speed sensor 13 which detects a vehicle speed, and a crank angle sensor 14 which outputs a crank angle pulse along with an engine operation. Based on the crank angle pulse, a crank angle of the engine and an engine speed are detected.

The above signals from the sensors and switches are transmitted to a microcomputer 16 provided in an engine control apparatus 15. This microcomputer 16 is for controlling an output of the engine and is referred to an EG-MC 16, hereinafter. This EG-MC 16 functions as an output controller. The EG-MC 16 computes a throttle-position command value (target throttle position) based on the detected accelerator position and engine driving conditions. This throttle-position command value is transmitted to a throttle actuator 17, such as a motor, so that an actual throttle position agrees with the throttle-position command value. Furthermore, the EG-MC 16 executes a fuel injection control and an ignition timing control, whereby a fuel injection quantity, a fuel injection timing and an ignition timing are properly controlled based on engine driving conditions.

When the EG-MC 16 determines that an accelerator pedal and a brake pedal are simultaneously stepped based on the signals from the accelerator position sensor 11 and a brake switch 12, the EG-MC 16 executes a first output-reducing control in which an accelerator sensor signal (detected value of accelerator operation amount) which will be transmitted into the EG-MC 16 from the accelerator position sensor 11 is compulsorily reduced. That is, the EG-MC 16 corresponds to a first output-reducing controller. A first switch 18 is arranged between the accelerator position sensor 11 and the EG-MC 16. When it is determined that the accelerator pedal and the brake pedal are simultaneously stepped, the first switch 18 is turned OFF so that the accelerator sensor signal which will be transmitted into the EG-MC 16 is compulsorily made zero (accelerator is at full-close position). Thereby, throttle-position command value which will be transmitted to the throttle actuator 17 from the EG-MC 16 is decreased to a value corresponding to an idling state, so that the engine output is reduced.

Furthermore, when the EG-MC 16 determines that the engine output is not reduced even though the first output-reducing control has been executed, the EG-MC 16 executes a second output-reducing control in which a condition of the throttle actuator 17 is compulsorily switched into a condition corresponding to an idling condition, whereby the engine output is compulsorily reduced. The EG-MC 16 functions as a second output-reducing controller. A second switch 20 is arranged between a battery 19 and throttle actuator 17. When it is determined that the engine output is not reduced even though the first output-reducing control has been executed, the second switch 20 is turned OFF, so that the throttle actuator 17 is deenergized. The throttle valve is compulsorily brought into a position corresponding to the idling state by a biasing force of a throttle return spring.

In the first embodiment, when the vehicle speed or the engine speed NE are not decreased for a specified time period even though the first output-reducing control has been executed, the EG-MC 16 determines that the engine output can not be reduced by the first output-reducing control.

FIG. 2 is a flowchart showing a processing of the output-reducing control which the EG-MC 16 executes according to the first embodiment. This routine is executed at specified intervals while the EG-MC 16 is ON. In step 101, the EG-MC 16 reads output signals from the accelerator position sensor 11, the brake switch 12, the vehicle speed sensor 13, the crank angle sensor 14 and the like. In step 102, the EG-MC 16 determines whether the brake pedal is stepped based on the signal from the brake switch 12. When the answer is NO in step 102, the procedure ends.

When the answer is YES in step 102, the procedure proceeds to step 103 in which the EG-MC 16 determines whether the accelerator pedal is stepped over a specified amount based on the signals from the accelerator position sensor 11. When the answer is NO in step 103, the procedure ends. In a case that the accelerator pedal and the brake pedal are stepped simultaneously, if the stepped amount of the accelerator pedal is small, the vehicle can be decelerated.

Meanwhile, when the answers are YES in steps 102 and 103, that is, when the brake pedal is stepped and the accelerator pedal is stepped over the specified amount, an execution condition of the first output-reducing control is established and the procedure proceeds to step 104. In step 104, the first switch 18 is turned OFF so that the accelerator sensor signal which will be transmitted into the EG-MC 16 is compulsorily made zero (accelerator is at full-close position). The throttle-position command value which will be transmitted from the EG-MC 16 into the throttle actuator 17 is reduced to a value corresponding to the idling state. Thus, the engine output is reduced. The processes in steps 101 to 104 correspond to a first output-reducing controller.

Then, the procedure proceeds to step 105 in which the EG-MC 16 determines whether the vehicle speed or the engine speed NE is maintained for a specified time period even though the first output-reducing control has been executed. When EG-MC 16 determines that the vehicle speed or the engine speed NE is decreased (answer is NO in step 105), it is determined that the first output-reducing control effectively functions to end the procedure.

When a high vehicle speed or a high engine speed NE is maintained for a specified period (answer is YES in step 105), the EG-MC 16 determines that the first output-reducing control does not effectively function and an executing condition of the second output-reducing control is established. The procedure proceeds to step 106 in which the second output-reducing control is executed. That is, the second switch 20 is turned OFF and the throttle actuator 17 is deenergized. The throttle valve is compulsorily brought into a position corresponding to the idling state by a biasing force of a throttle return spring.

In the present embodiment, when executing the second output-reducing control, the throttle actuator 17 is deenergized. Meanwhile, it can be conceivable that the throttle actuator 17 is deenergized when the first output-reducing control is executed.

However, if the throttle actuator is deenergized when the first output-reducing control is executed, the first output-reducing control cancels other controls, such as traction control, electronic stability control and cruise control. The throttle valve is compulsorily closed, whereby the above controls do not function and a drivability may be deteriorated.

In view of the above, according to the first embodiment, when executing the first output-reducing control, the accelerator sensor signal which will be transmitted into the EG-MC 16 is compulsorily made zero (accelerator is at full-close position). The throttle-position command value which will be transmitted to the throttle actuator 17 from the EG-MC 16 is decreased to a value corresponding to an idling state, so that the engine output is reduced. Therefore, even while the first output-reducing control is executed, the throttle-position command value can be established according to a required throttle position. Based on the required throttle position, the other controls can be executed. Thus, while restricting a deterioration in drivability, the engine output can be reduced.

If the throttle-position command value transmitted from the EG-MC 16 is not decreased even though the accelerator sensor signal is compulsorily made zero, the engine output can not be reduced by the first output-reducing control. In this case, the second output-reducing control is executed to de-energize the throttle actuator 17. Thus, the throttle valve is compulsorily brought into a position corresponding to the idling state by a biasing force of the throttle return spring. Even if the accelerator pedal and the brake pedal are stepped simultaneously, the engine output can be surely reduced.

Second Embodiment

In the above first embodiment, two output-reducing controls are performed. In a second embodiment, three or more output-reducing controls are performed. Hereafter, referring to FIG. 3, the second embodiment will be described. A system configuration is the same as the first embodiment.

In step 201, the EG-MC 16 reads signals from various sensors and switches. In step 202, the EG-MC 16 determines whether a brake pedal is stepped. When the answer is NO in step 202, the procedure ends.

When the answer is YES in step 202, the procedure proceeds to step 203 in which the EG-MC 16 determines whether the accelerator pedal is stepped over a specified amount based on the signals from the accelerator position sensor 11. When the answer is NO in step 103, the procedure ends.

Meanwhile, when the answers are YES in steps 202 and 203, that is, when the brake pedal is stepped and the accelerator pedal is stepped over the specified amount, an execution condition of the first output-reducing control is established and the procedure proceeds to step 204. In step 204, the first switch 18 is turned OFF so that the accelerator sensor signal which will be transmitted into the EG-MC 16 is compulsorily made zero (accelerator is at full-close position). The throttle-position command value which will be transmitted from the EG-MC 16 into the throttle actuator 17 is reduced to a value corresponding to the idling state. Thus, the engine output is reduced. The processes in steps 201 to 204 correspond to a first output-reducing controller.

Then, the procedure proceeds to step 205 in which the EG-MC 16 determines whether the vehicle speed or the engine speed NE is maintained for a specified time period even though the first output-reducing control has been executed. When EG-MC 16 determines that the vehicle speed or the engine speed NE is decreased (answer is NO in step 205), it is determined that the first output-reducing control effectively functions to end the procedure.

When a high vehicle speed or a high engine speed NE is maintained for a specified period (answer is YES in step 205), the EG-MC 16 determines that the first output-reducing control does not effectively function and an executing condition of the second output-reducing control is established. The procedure proceeds to step 206 in which a second output-reducing control is performed. In the second output-reducing control, the throttle-position command value which will be transmitted from the EG-MC 16 into the throttle actuator 17 is reduced to a value corresponding to the idling state. Thus, the engine output is reduced.

Then, the procedure proceeds to step 207 in which the EG-MC 16 determines whether the vehicle speed or the engine speed NE is maintained for a specified time period even though the second output-reducing control has been executed. When EG-MC 16 determines that the vehicle speed or the engine speed NE is decreased (answer is NO in step 205), it is determined that the second output-reducing control effectively functions to end the procedure.

When a high vehicle speed or a high engine speed NE is maintained for a specified period (answer is YES in step 207), the EG-MC 16 determines that the second output-reducing control does not effectively function and the procedure proceeds to step 208. In step 208, the EG-MC 16 performs a third output-reducing control. The second switch 20 is turned OFF and the throttle actuator 17 is deenergized. Thus, the throttle valve is compulsorily brought into a position corresponding to the idling state by a biasing force of the throttle return spring.

Then, the procedure proceeds to step 209 in which the EG-MC 16 determines whether the vehicle speed or the engine speed NE is maintained for a specified time period even though the third output-reducing control has been executed. When EG-MC 16 determines that the vehicle speed or the engine speed NE is decreased (answer is NO in step 207), it is determined that the third output-reducing control effectively functions to end the procedure.

When a high vehicle speed or a high engine speed NE is maintained for a specified period (answer is YES in step 209), the EG-MC 16 determines that the third output-reducing control does not effectively function and the procedure proceeds to step 210. In step 210, a fourth output-reducing control is performed, so that the fuel injection or the fuel ignition is intermittently performed to reduce the engine output.

Then, the procedure proceeds to step 211 in which the EG-MC 16 determines whether the vehicle speed or the engine speed NE is maintained for a specified time period even though the fourth output-reducing control has been executed. When EG-MC 16 determines that the vehicle speed or the engine speed NE is decreased (answer is NO in step 211), it is determined that the fourth output-reducing control effectively functions to end the procedure.

When a high vehicle speed or a high engine speed NE is maintained for a specified period (answer is YES in step 211), the EG-MC 16 determines that the fourth output-reducing control does not effectively function and the procedure proceeds to step 212. In step 212, a fifth output-reducing control is performed, so that the fuel injection (and/or fuel ignition) is completely terminated to turn OFF the engine. The processes in steps 205 to 212 correspond to a second output-reducing controller of the present invention.

According to the above described second embodiment, when the accelerator pedal and the brake pedal are stepped simultaneously, the output-reducing controls are stepwise performed until it is determined that the engine output is reduced. Thus, while restricting a deterioration in drivability and emission, the engine output can be surely reduced.

In the above second embodiment, although the first to the fifth output-reducing controls are performed, the first to the three output-reducing controls may be performed. Alternatively, the first to a sixth or more output-reducing controls may be performed.

Third Embodiment

Figure 4:
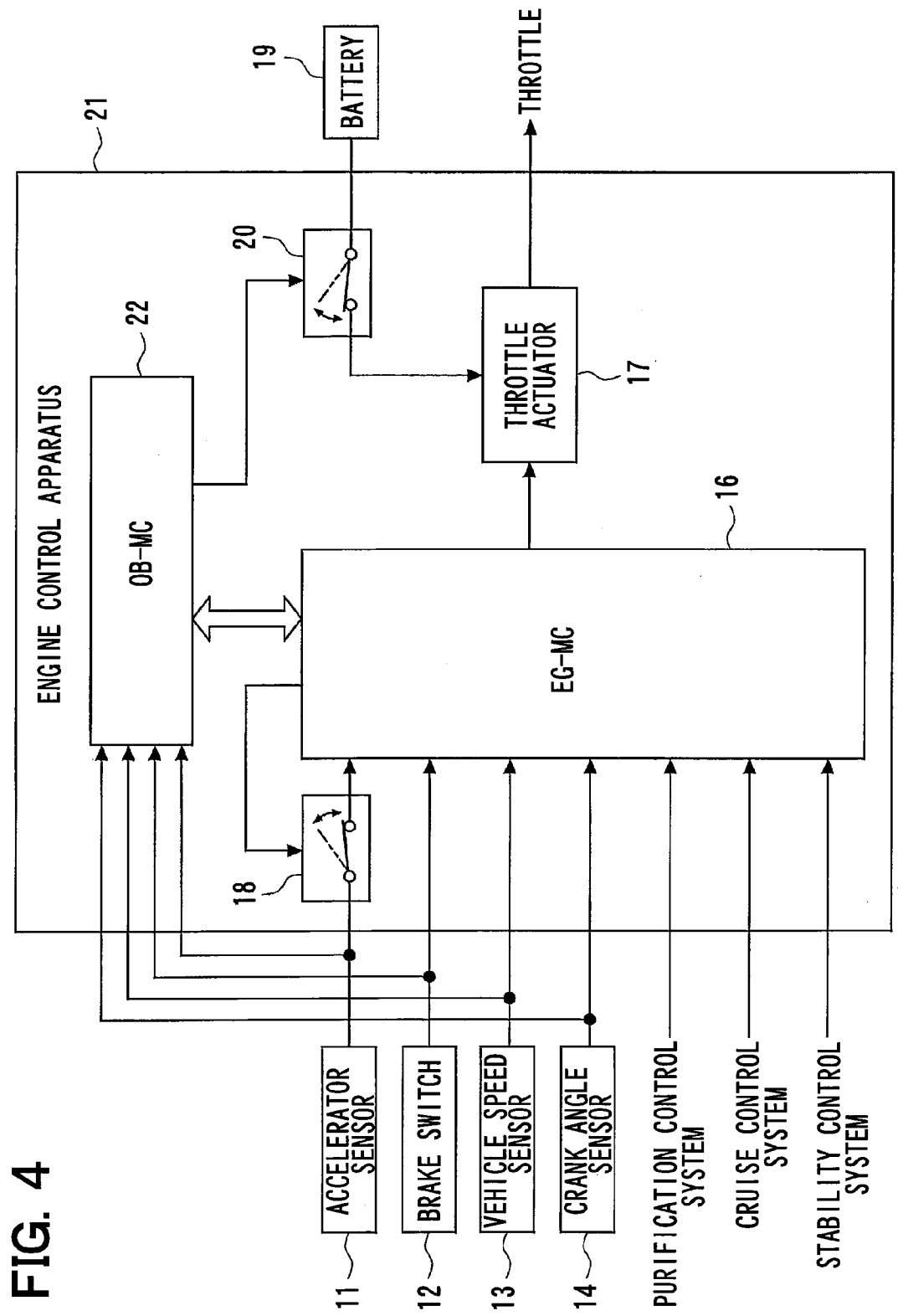
FIG. 4 is a block diagram showing a configuration of vehicle control system according to a third embodiment.

FIG. 4 shows a vehicle control system according to a third embodiment. An engine control apparatus 21 includes the EG-MC 16 and an observation microcomputer 22. This observation microcomputer 22 is referred to as an OB-MC 22, hereinafter. The EG-MC 16 includes a function of the first output-reducing controller and the OB-MC 22 includes a function of the second output-reducing controller.

Figure 3:
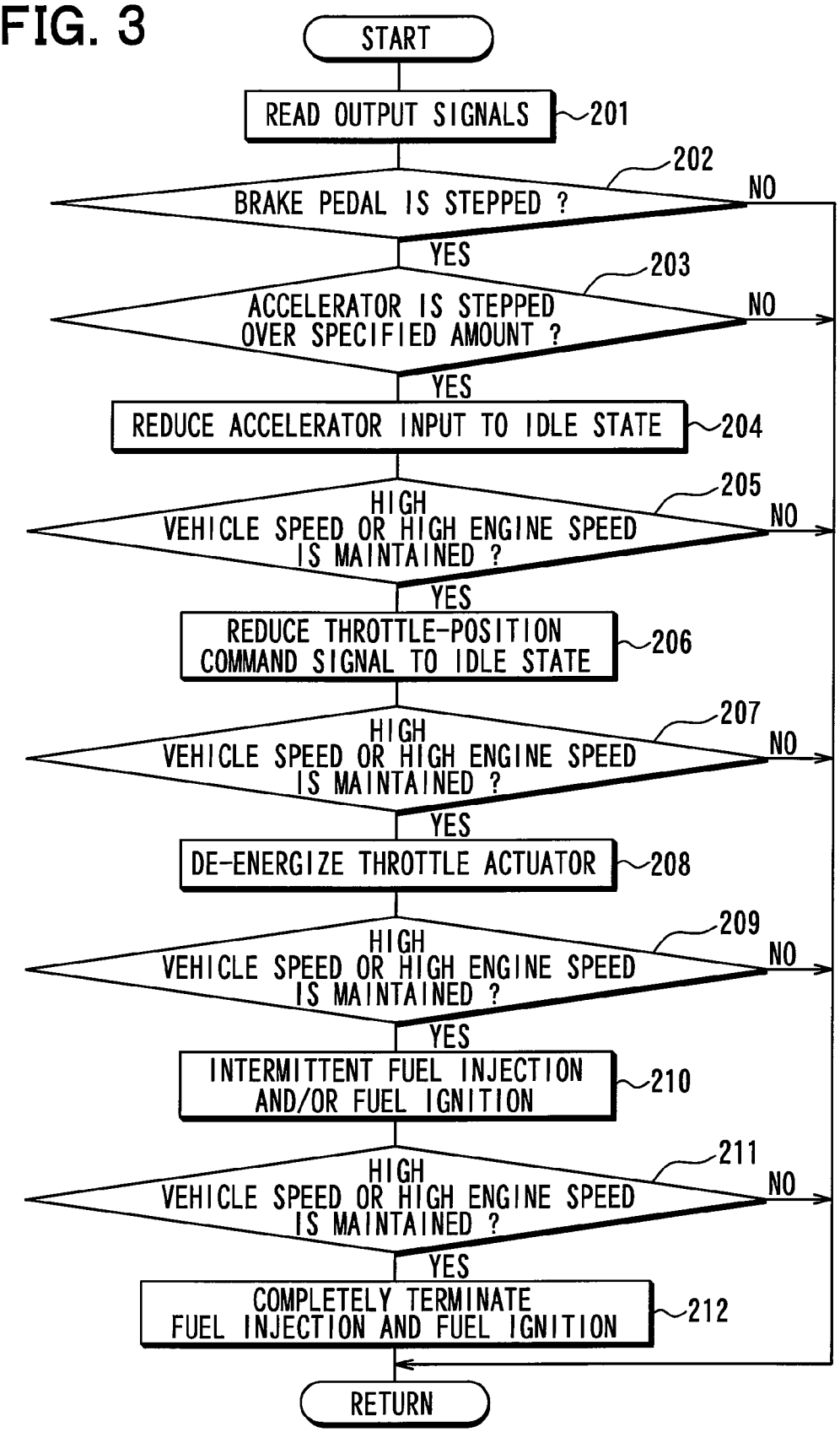
FIG. 3 is a flowchart showing a processing of the output-reducing control according to a second embodiment.

The EG-MC 16 and the OB-MC 22 cooperatively perform the output-reducing control program shown in FIG. 2 or the output-reducing control program shown in FIG. 3. The EG-MC 16 performs the processing of the first output-reducing controller. The OB-MC 22 performs the processing of the second output-reducing controller.

According to the third embodiment, even if the EG-MC 16 can not reduce the engine output, the OB-MC 22 can surely reduce the engine output.

Besides, the OB-MC 22 may include functions of the first and the second output-reducing controller. In the above embodiments, when the accelerator pedal and the brake pedal are simultaneously stepped, the throttle position is brought into a position corresponding to an idling state. However, the throttle position may be brought into a position at which the vehicle runs safely without any troubles.

The above disclosure can be applied to not only a vehicle having an internal combustion engine but also an electric vehicle driven by a motor or a hybrid vehicle driven by an engine and a motor. In a case of an electric vehicle, an actuator for adjusting an engine output is an inverter which adjusts a motor output. In a case of a hybrid vehicle, actuators for adjusting output are provided for an engine and a motor.

What is claimed is:

1. A vehicle controller for controlling a vehicle equipped with at least one of an internal combustion engine and a motor as a driving source, the vehicle controller comprising:
   an accelerator-operation detector configured to detect an accelerator operation;
   a brake-operation detector configured to detect a brake operation;
   an output controller configured to control an output of the driving source according to an accelerator operation amount detected by the accelerator-operation detector;
   a first output-reducing controller configured to perform a first output-reducing control in which an accelerator operation amount which will be transmitted into the output controller from the accelerator-operation detector is compulsorily reduced, when the accelerator-operation detector and the brake-operation detector simultaneously detect the accelerator operation and the brake operation; and
   a second output-reducing controller configured to perform a second output-reducing control in which an output of the driving source is compulsorily reduced, when it is determined that the output of the driving source is not reduced even though the first output-reducing control has been performed.

2. A vehicle controller according to claim 1, wherein the second output-reducing controller is further configured to de-energize an actuator adjusting output of the driving source so that the output of the driving source is reduced.

3. A vehicle controller according to claim 1, wherein the second output-reducing controller is further configured to reduce an output command value which will be transmitted from the output controller to an actuator adjusting output of the driving source so that the output of the driving source is reduced.

4. A vehicle controller according to claim 1, wherein the driving source is an internal combustion engine; and the second output-reducing controller is further configured to intermittently perform at least one of a fuel injection and a fuel ignition so that the output of the driving source is reduced.

5. A vehicle controller according to claim 1, wherein the second output-reducing controller is further configured to perform another additional output-reducing control so that the output of the driving source is reduced, when it is determined that the output of the driving source is not reduced even though the second output-reducing control has been performed.

6. A vehicle controller according to claim 5, wherein the second output-reducing controller is further configured to repeatedly perform the additional output-reducing control by stepwise switching the output-reducing control until it is determined that the output of the driving source is reduced.

7. A vehicle controller according to claim 1, wherein the second output-reducing controller is further configured to turn off the driving source when it is determined that the output of the driving source will not be finally reduced.

8. A vehicle controller according to claim 1, wherein the second output-reducing controller is further configured to determine that the output of the driving source is not be reduced when a vehicle speed or a driving source speed has not been reduced for a specified time period even though the output-reducing control has been performed.

9. A vehicle controller according to claim 1, wherein:
   the output controller and the first output-reducing controller are configured by an engine output control microcomputer; and
   the second output-reducing controller is configured by an observation microcomputer.

10. A vehicle controller for controlling a vehicle equipped with at least one of an internal combustion engine and a motor as a driving source, the vehicle controller comprising:
    an accelerator-operation detector detecting an accelerator operation;
    a brake-operation detector detecting a brake operation; and
    a control apparatus, including a computer, the control apparatus being at least configured to:
       control an output of the driving source according to an accelerator operation amount detected by the accelerator-operation detector;
       perform a first output-reducing control in which an accelerator operation amount which will be transmitted into the control apparatus from the accelerator-operation detector is compulsorily reduced, when the accelerator-operation detector and the brake-operation detector simultaneously detect the accelerator operation and the brake operation; and
       perform a second output-reducing control in which an output of the driving source is compulsorily reduced, when it is determined that the output of the driving source is not reduced even though the first output-reducing control has been performed.

11. A vehicle controller according to claim 10, wherein the control apparatus is further configured to de-energize an actuator adjusting output of the driving source so that the output of the driving source is reduced.

12. A vehicle controller according to claim 10, wherein the control apparatus is further configured to reduce an output command value which will be transmitted from the output controller to an actuator adjusting output of the driving source so that the output of the driving source is reduced.

13. A vehicle controller according to claim 10, wherein the driving source is an internal combustion engine; and the control apparatus is further configured to intermittently perform at least one of a fuel injection and a fuel ignition so that the output of the driving source is reduced.

14. A vehicle controller according to claim 10, wherein the control apparatus is further configured to perform another additional output-reducing control so that the output of the driving source is reduced, when it is determined that the output of the driving source is not reduced even though the second output-reducing control has been performed.

15. A vehicle controller according to claim 14, wherein
the control apparatus is further configured to repeatedly
perform the additional output-reducing control by stepwise switching the output-reducing control until it is determined that the output of the driving source is reduced.

16. A vehicle controller according to claim 10, wherein
the control apparatus is further configured to turn off the driving source when it is determined that the output of the driving source will not be finally reduced.

17. A vehicle controller according to claim 10, wherein
the control apparatus is further configured to determine that the output of the driving source is not be reduced when a vehicle speed or a driving source speed has not been reduced for a specified time period even though the output-reducing control has been performed.

* * * * *